July 26, 1966         W. R. WHEELER         3,263,025
DEMOUNTABLE METAL-TO-CERAMIC SEAL
Filed July 30, 1963

United States Patent Office 3,263,025
Patented July 26, 1966

3,263,025
DEMOUNTABLE METAL-TO-CERAMIC SEAL
William R. Wheeler, Saratoga, Calif., assignor to Varian Associates, Palo Alto, Calif., a corporation of California
Filed July 30, 1963, Ser. No. 298,630
5 Claims. (Cl. 174—151)

This invention relates in general to vacuum seals and more particularly to a demountable metal-to-ceramic compression seal.

In many vacuum applications, the advantages of using ceramic as an electrical insulating material have become recognized, not only because of its good electrical properties, but also because of its ability to withstand breakage and high temperatures, as, for example, during bakeout. When ceramic is used as the electrical insulating material, at least one, and usually more, metal-to-ceramic seals are required. For example, in a high voltage feedthrough, one metal-to-ceramic seal is required between the insulator and the lead-in conductor, and another between the insulator and the feedthrough body.

In the metal-to-ceramic seals of the prior art, it is necessary to somehow bond the metal to the ceramic insulating material, as for example, by metallizing a portion of the ceramic material, bringing that portion in abutting arrangement to the metal surface to which it is to be joined, and affixing it thereto with suitable bonding material.

Although these prior art seals will function satisfactorily there are several inherent disadvantages which detract from their utility. It is difficult to bring the ceramic and the metal to which it is to be sealed into uniform engagement. For this reason the seal is frequently weak structurally, and thus will begin to leak or form gas pockets which subsequently cause contamination of the vacuum system or other device in which it is utilized. Furthermore, in order to assure even a reasonably good seal very precise machining of the metal and ceramic is required. Moreover, the entire process is both time consuming and expensive.

Accordingly, it is the object of the present invention to provide a metal-to-ceramic seal, which not only overcomes the above mentioned and other disadvantages of the prior art, but also provides a novel demountable metal-to-ceramic compression seal that completely avoids the necessity of using any bonding material.

Other objects and features of the present invention and a further understanding may be had by referring to the following description and claims taken in conjunction with the following drawings in which:

FIG. 1 is a fragmentary cross-sectional view of a high voltage feedthrough utilizing the novel metal-to-meramic seal of the present invention;

FIG. 2 is an enlarged cross-sectional view of the area delineated by 2—2 in FIG. 1; and FIG. 3 is an enlarged cross-sectional view of the area delineated by 2—2 in FIG. 1, but with the metal-to-ceramic seal tightened.

Referring now to FIG. 1, there is shown a high voltage feedthrough 11 utilizing the novel metal-to-ceramic seal of the present invention. Positioned between a pair of annular flange members 12, 13 is a circular insulator 14 as of, for example, alumina ceramic. The ceramic is preferably ground smooth after firing to remove any loosely adhering particles. Flange members 12, 13 are provided with a plurality of circumferentially arranged holes 15, 16 which accommodate a plurality of bolts 17 made of, for example, stainless steel. Each of the bolts 17 has a washer 18, and a nut 19 for providing a force to cause relative movement between the annular flange members 12, 13. A sealing gasket 20, made from a soft metal, as, for example, copper, is spaced between insulator 14 and flange member 13, in a manner to be described hereafter, such that when nut 19 is tightened on bolt 17, a vacuum tight seal is created between metal flange member 13 and ceramic insulator 14.

Flange member 12 has a generally rectangular cross-section with one smooth outer edge 21 and two flat sides 22, 23. The inner edge 24 is generally flat, except for a riser 25 and step 26 portion which together forms a recess against which the ceramic insulator 14 abuts in assembly. Flange member 13 also has a generally rectangular cross-section with smooth outer edge 27 and flat sides 28, 29. The inner edge of flange member 13 has an inner side wall 30, against which the ceramic insulator 14 abuts during assembly, an inner side 31 and a slanted side 32 which terminates at one end against the inner side wall 30 at an acute angle $\theta$ therewith and forms an apex 33 at the other end with inner side 31. Inner side 31 is generally smooth except for a ridge portion 34 of rectangular cross-section.

The insulator member 14 may also have a rectangular cross-section with a smooth outer edge 35 and one flat side 36. The second side 37 is also flat except for a beveled portion which forms a slanted side 38 at an acute angle $\theta$, with outer edge 35, or direction of relative movement. Insulator 14 has a centrally located aperture 39 through which passes a conductive rod 40 in vacuum tight communication.

A sealing gasket 20 of soft metallic material, and either of circular or square cross-section may be utilized. A square cross-section is somewhat easier to fabricate and less costly.

In operation, ridge portion 34 is secured by, for example, welding to a vacuum system component 41. The soft metal gasket 20 is positioned between the aligned and slanted sides 32, 38. The gasket 20 is of such a size that its outer edge lies closely adjacent side wall 30 and its flat top and bottom faces engage the slanted sides 38 and 32. Nuts 19 are then tightened on bolts 17 which results in a relative movement between flange member 13, insulator 14 and gasket 20.

The relative movement between flange member 13, insulator 14 and gasket 20 causes compression of the gasket 20 by the slanted sides 32, 38. A normal force proportional to the total force applied by the bolts 17 then exists at the slanted sides 32, 38. The normal force has a component which is parallel to the direction of relative movemnet and a component which is perpendicular to this direction of relative movement. However, the soft metal gasket material is restricted from moving in the direction of relative movement by the slanted sides 32, 38 and is restricted from moving in the direction perpendicular to the direction of relative movement by inner side wall 30.

Thus, the slanted sides 32, 38, and inner side wall 30 form a compartment which traps the soft gasket material. The trapping of the gasket material results in the attainment and maintenance of extremely high pressure at the interface between the gasket 20 and slanted sides 32, 38, thereby forming a truly intimate fit. It is believed that the gasket material, when stressed beyond its elastic limit, can be regarded as a highly viscous fluid. A period of time is therefore required for the gasket material to flow into the scratches and irregularities. Seal geometries which do not effectively capture the gasket material adjacent to the seal area allow the body of the gasket to distort thereby relieving the pressure at the interface before a truly intimate fit has been achieved. It is preferably that a washer 42 of soft metal as, for example, copper, be placed between step portion 26 and insulator 14 so as to relieve localized stresses within the insulator 14.

The preferable size of the angle which the slanted sides 32, 38 make with the direction of relative movement has been found to be in the range between 45° and 75° inclusive. It appears that the amount of pressure which can be maintained in the contact area between the gasket 20 and the slanted sides 32, 38 for a given applied force is dependent on this angle. It is believed that this unit pressure is in a maximum range for angles between 45° and 75° with an apparent absolute maximum around 70°.

There are other advantages for utilizing an angle between 45° and 75°. For example, as the angle becomes exceedingly large, the trapping ability of the slanted side is lessened, the gasket material having a greater freedom of movement in a direction away from the inner wall 30.

It should be apparent that the same type metal-to-ceramic seal may be created between the conductive rod 40 and insulator 14. The rod 40 may be threaded at 43 and a vacuum tight seal is created by torquing up the nut 44.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A demountable metal-to-ceramic seal to be used between a high and low pressure region comprising: a metal member and a ceramic member spaced from each other and adapted for relative movement along a longitudinal axis towards each other; said metal member having a shoulder portion with an inner wall substantially parallel to the longitudinal axis; said metal member being provided with a ridge portion having a slanted side angled toward said inner wall to define an acute angle therebetween; said ceramic member being provided with a surface facing in the direction of relative movement of said ceramic member toward said metal member; said surface having a bevelled portion forming a slanted side angled toward said inner wall to define an acuate angle therewith when said metal member and said ceramic member are drawn together in the direction of relative movement; said slanted sides being opposite each other and forming a cavity with said inner wall; and a soft metal sealing gasket disposed within said cavity in contact with said slanted sides and said inner wall.

2. The seal according to claim 1 wherein said gasket has a flat wall parallel to the longitudinal axis in contact with said inner wall.

3. The seal according to claim 1, wherein said ceramic member has a side which abuts against the inner wall of the shoulder portion of said metal member.

4. The seal according to claim 1 wherein the acute angle of the slanted side on said metal member is between 45° and 75° in size; and the acute angle of the slanted side on said ceramic member is between 45° and 75° in size.

5. The seal according to claim 1 wherein the acute angle of the slanted side on said metal member is between 45° and 75° in size; and the acute angle of the slanted side on said ceramic member is between 45° and 75° in size.

References Cited by the Examiner

UNITED STATES PATENTS

| | | | |
|---|---|---|---|
| 1,147,818 | 7/1915 | Schmidt | 313—144 X |
| 1,215,074 | 2/1917 | Story | 174—151 |
| 1,855,494 | 4/1932 | Sorensen | 277—236 X |
| 2,250,355 | 6/1941 | Bruck | 313—144 |
| 2,439,173 | 4/1948 | Langmuir | 174—50.57 X |
| 2,616,946 | 11/1952 | Scheer | 174—151 |
| 2,906,908 | 9/1959 | Mallory | 313—144 |

FOREIGN PATENTS

| | | |
|---|---|---|
| 502,418 | 7/1930 | Germany. |
| 379,709 | 4/1940 | Italy. |
| 130,503 | 12/1928 | Switzerland. |

ROBERT K. SCHAEFER, *Primary Examiner.*

DARRELL L. CLAY, JOHN F. BURNS, *Examiners.*

W. B. FREDERICKS, *Assistant Examiner.*